Patented Dec. 13, 1938

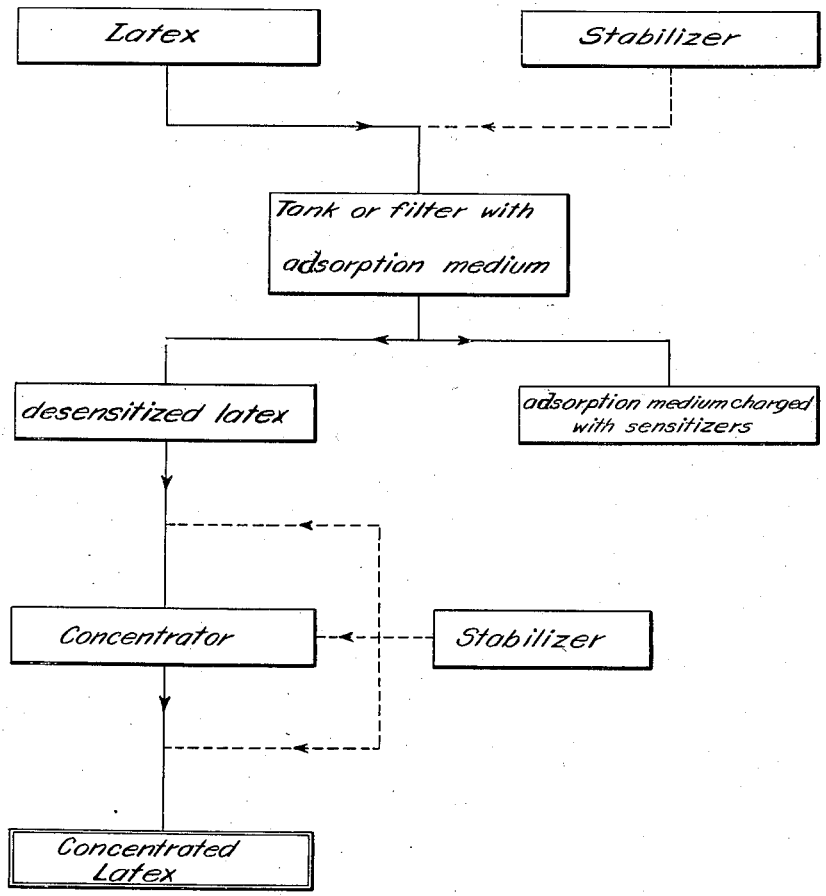

2,140,198

UNITED STATES PATENT OFFICE 2,140,198

PROCESS FOR CONCENTRATING RUBBER LATEX

Ernst Benzing and Johannes Jaenicke, Frankfort-on-the-Main, Germany, assignors, by mesne assignments, to Revertex Limited, London, England, a corporation of England Application November 29, 1935, Serial No. 52,192
In Germany December 5, 1934

2 Claims. (Cl. 18—50)

This invention relates to a process for concentrating rubber latex and similar vegetable juices, and to the product of such process.

Heretofore attempts to produce rubber latex concentrates were made with pure rubber latex or with latex such as contained antiputrefactive agents. In this manner, but a slightly increased concentration could be obtained because coagulation very soon set in during the operation due to the fact that natural rubber latex contains non-rubber substances which counteract its powers of resistance to coagulating influences.

The object of the present invention is to treat the latex by first desensitizing it by the complete or partial elimination of those substances which render rubber latex susceptible toward coagulating influences, whereby the latex may be brought into higher degrees of concentration to furnish concentrates of greater stability than those furnished by latices in which such substances are present and, second, concentrating the so desensitized latex.

The present invention accordingly comprises first removing a portion of the non-rubber substances from the rubber latex and then concentrating the latter in known manner and in an alkaline or acid condition, for example by evaporation, creaming, centrifuging, filtering, or by several of these methods in combination. Particularly good results are obtained when the stability of the rubber latex is improved by adding stabilizing agents, such as protective colloids, in addition to removing the sensitizing substances. The stabilizing agents may be added before, during, or after concentration. The accompanying drawing illustrates diagrammatically this invention, the addition of the stabilizing agents being indicated by dotted lines.

The non-rubber constituents which lower the stability of the latex are removed by treating the alkaline or acid latex, to which preservatives and/or protective colloids have been added, if desired, with suitable adsorptive media, such as active charcoal, silica gel, aluminium oxide and ferric oxide. The different adsorptive media may be employed in succession if desired.

Since in the present process proteids, especially such as are readily coagulable, are separated in addition to other substances from the latex, the result is not only to desensitize the latex, but also to obtain a purification thereof prior to concentration.

The desensitized latex is admirably adapted for the production of concentrates by evaporation because, in consequence of its exceedingly small content of substances that are sensitive to heat, it can be inspissated to form surprisingly stable concentrates, without skinning and coagulation, even without the addition of protective colloids.

The latex which has been pretreated in accordance with the present invention can be employed with advantage for the production of latex concentrates by centrifuging. In such case not only is the high degree of purity of the resulting cream of importance, but also the fact that the efficiency of the centrifuge is increased because, owing to the greater mechanical stability of the desensitized latex, the troublesome cleaning of the centrifuge, hitherto necessary after short working periods, has to be undertaken only at comparatively rare intervals. Moreover, in the case of desensitized latex, the centrifuging can be easily performed at elevated temperature, which hitherto has been a matter of considerable difficulty owing to the known sensitiveness of latex to the influence of temperature.

Creaming also is facilitated by the desensitizing pretreatment of the latex in accordance with the present invention. The separation of serum is accelerated to a greater degree than in the case of untreated latex, and a cream characterized by a high rubber content and particularly low content of non-rubber constituents is obtained, together with a remarkably clear serum.

In respect of filtration properties, the pretreatment of the present invention also has an extremely favorable effect on the latex. Comparatively coarse deposits are obtained on the filter, and the pores of the latter become clogged far less rapidly than in the case of ordinary latex.

In the case of the latex concentrates produced in accordance with the present invention, the risk of decomposition by bacteria is lessened to an extraordinary degree, since the concentrates contain only fractional amounts of the decomposable substances normally present (proteids and carbohydrates in particular). This advantage of the present process finds expression in a sensible economy of preservatives.

Hitherto, it has been impossible in practice to produce concentrates with such a high degree of purity as is obtainable by the process of the present invention. It has already been proposed, it is true, to obtain very pure latex concentrates by removing a portion of the serum, by centrifuging, filtration or creaming, and to repeat these operations—after the addition of clean water in each case—until the separated sera contains the bulk of the non-rubber constituents. This procedure, however, is so expensive and complicated that it is suitable only for laboratory work, but not for the production of concentrates on a manufacturing scale.

The latex concentrates produced by the process of the present invention form a valuable new starting material for the industries employing rubber latex; and, since they furnish colorless, quick drying and non-tacky films, are admirably adapted for the production of dipped and spread articles.

*Example I*

1000 kgs. of rubber latex taken from a large stock were preserved with 200 milli-equivalents of $NH_3$ per kg. and then allowed to flow for a period of four hours through a stratified filter charged with active charcoal (zinc chloride charcoal being the particular form here used) which had been steamed, washed and slightly dried. 300 kgs. of the latex treated in this manner were inspissated to a dry substance content of 75.1% in a concentrator of the kind described in the copending application Serial No. 609,660. The concentrate obtained from the charcoal-treated latex contained only 5.7% of non-coagulable dissolved or dispersed constituents calculated on the crepe content and the concentrated latex exhibited only a trace of coagulated matter.

*Example II*

300 kgs. of the same latex, pretreated with charcoal, as described in Example I were creamed with the addition of 9 liters of a 3% solution of potassium polyacrylate. After standing for two days, the serum was separated from the cream. A clear serum was obtained and the cream obtained contained only 3.2% of non-coagulable dissolved or dispersed constituents, reckoned on the crepe content.

We claim:

1. A process for producing a relatively stable latex of high concentration which comprises the steps of desensitizing a natural rubber latex by treating it with a medium that will adsorb and remove from the latex a portion of those non-rubber constituents of the latex which render it susceptible toward coagulating influences, and thereafter concentrating the desensitized latex.

2. A process for producing a relatively stable latex of high concentration which comprises the steps of desensitizing a natural rubber latex by passing it through a filter charged with active charcoal to remove from the latex a portion of those non-rubber constituents of the latex which render it susceptible toward coagulating influences and thereafter concentrating the desensitized latex.

ERNST BENZING.
JOHANNES JAENICKE.